US012361562B2

(12) United States Patent
Shibata et al.

(10) Patent No.: US 12,361,562 B2
(45) Date of Patent: Jul. 15, 2025

(54) DETERMINATION, FOR EACH POINT IN MAPPING POINT CLOUD, OF ONE OF THE LABELS ASSIGNED TO THE POINT BASED ON VOTING RESULTS OF THE LABELS

(71) Applicant: NEC Corporation, Tokyo (JP)

(72) Inventors: Takashi Shibata, Tokyo (JP); Kosuke Yoshimi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 427 days.

(21) Appl. No.: 17/801,559

(22) PCT Filed: Mar. 13, 2020

(86) PCT No.: PCT/JP2020/011021
§ 371 (c)(1),
(2) Date: Aug. 23, 2022

(87) PCT Pub. No.: WO2021/181647
PCT Pub. Date: Sep. 16, 2021

(65) Prior Publication Data
US 2023/0162371 A1    May 25, 2023

(51) Int. Cl.
*G06V 20/70* (2022.01)
*G06T 7/11* (2017.01)
(Continued)

(52) U.S. Cl.
CPC ............... *G06T 7/174* (2017.01); *G06T 7/11* (2017.01); *G06T 7/74* (2017.01); *G06V 20/70* (2022.01);
(Continued)

(58) Field of Classification Search
CPC ... G06T 7/174; G06T 7/11; G06T 7/74; G06T 2207/10028; G06T 2207/20021;
(Continued)

(56) References Cited

U.S. PATENT DOCUMENTS

2004/0022440 A1   2/2004  Akahori
2019/0286915 A1   9/2019  Patil
2021/0272355 A1*  9/2021  Jotwani .................. G06T 17/00

FOREIGN PATENT DOCUMENTS

JP   2009-123234 A   6/2009
JP   2014-186567 A   10/2014
(Continued)

OTHER PUBLICATIONS

A. Boulch, B. Le Saux and N. Audebert: "Unstructured point cloud semantic labeling using deep segmentation networks", 2017; Eurographics Workshop on 3D Object Retrieval; pp. 17-24. (Year: 2017).*

(Continued)

*Primary Examiner* — Siamak Harandi

(57) ABSTRACT

An image processing apparatus includes: a three-dimensional point cloud segmentation unit for segmenting a three-dimensional point cloud of an object using clustering parameters so that the smaller the distance between points in the three-dimensional point cloud is, the more likely the points are to be clustered into the same cluster; a cluster mapping (Continued)

unit for generating a mapped point cloud by mapping clusters of the three-dimensional point cloud to a two-dimensional image based on the correspondence between the coordinates of the three-dimensional point cloud and the coordinates of pixels of the two-dimensional image; a label matching unit for assigning labels to points in the mapped point cloud based on a target label and position information in the two-dimensional image; a matching result voting unit for voting for labels of the points; and a label determination unit for determining the label for the points based on voting results.

8 Claims, 7 Drawing Sheets

(51) Int. Cl.
  *G06T 7/174* (2017.01)
  *G06T 7/73* (2017.01)
(52) U.S. Cl.
  CPC .............. *G06T 2207/10028* (2013.01); *G06T 2207/20021* (2013.01); *G06T 2207/20092* (2013.01)
(58) Field of Classification Search
  CPC . G06T 2207/20092; G06T 2207/20081; G06T 2207/20084; G06V 20/70; G06V 10/267; G06V 10/762; G06V 20/64
  See application file for complete search history.

(56) References Cited

FOREIGN PATENT DOCUMENTS

| JP | 2016-003886 A | 1/2016 |
| JP | 2018-173707 A | 11/2018 |

OTHER PUBLICATIONS

Communication dated Apr. 11, 2023 issued by the Japanese Intellectual Property Office in counterpart Japanese Application No. 2022-505680.
International Search Report for PCT Application No. PCT/JP2020/011021, mailed on Jun. 23, 2000.
Nathan Silberman, Derek Hoiem, Pushmeet Kohli, and Rob Fergus. "Indoor segmentation and support inference from RGBD images", In European Conference on Computer Vision (ECCV), 2012, pp. 1-14.
Takashi Shibata, Masayuki Tanaka, and Masatoshi Okutomi. "Accurate joint geometric camera calibration of visible and far-infrared cameras." IS&T International Symposium on Electronic Imaging 2017, Image Sensors and Imaging Systems 2017, Nov. 2017, pp. 7-13.
Takashi Shibata, Masayuki Tanaka, and Masatoshi Okutomi. "Unified Image Fusion Framework With Learning-Based Application-Adaptive Importance Measure." IEEE Transactions on Computational Imaging, vol. 5, No. 1, Mar. 2019, pp. 82-96.
Jonathan Long, Evan Shelhamer, and Trevor Darrell. "Fully convolutional networks for semantic segmentation." Proceedings of the IEEE conference on computer vision and pattern recognition, 2015, pp. 1-10.

* cited by examiner

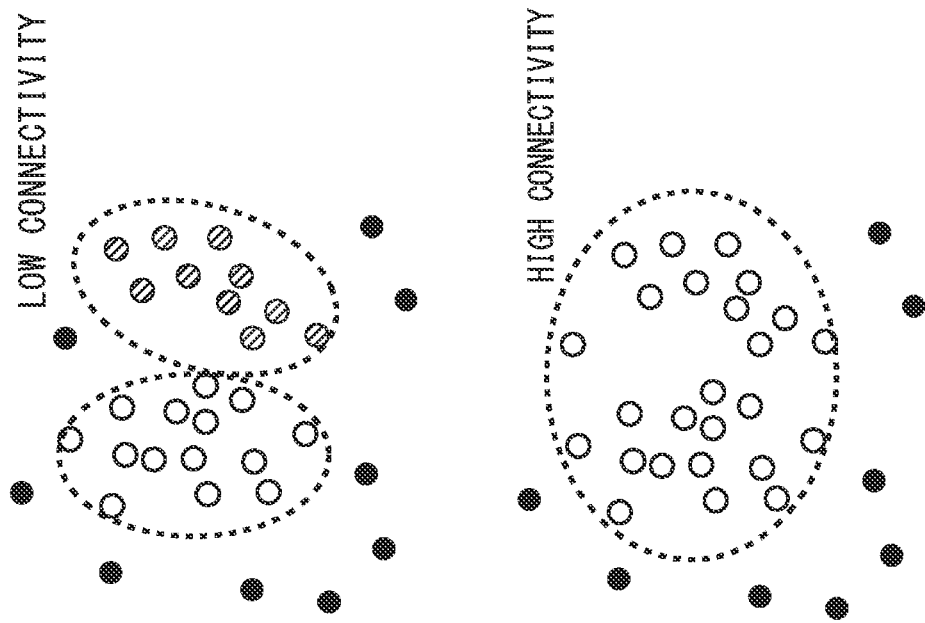
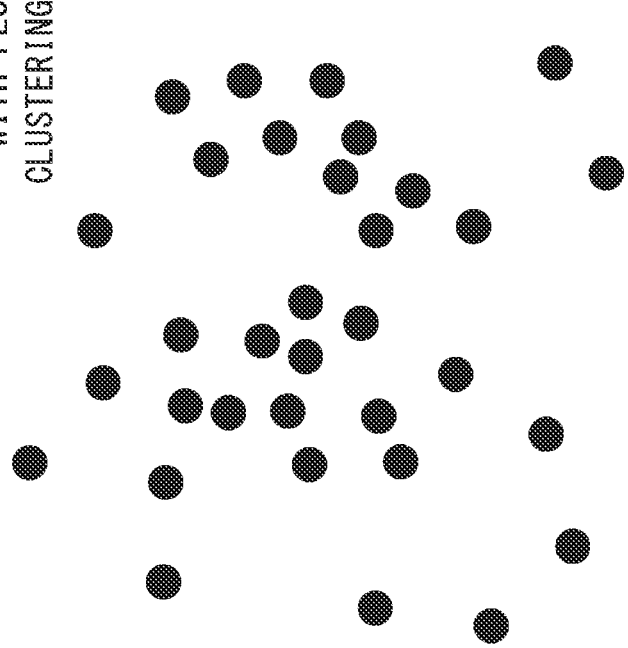
Fig. 3

DETERMINATION, FOR EACH POINT IN MAPPING POINT CLOUD, OF ONE OF THE LABELS ASSIGNED TO THE POINT BASED ON VOTING RESULTS OF THE LABELS

This application is a National Stage Entry of PCT/JP2020/011021 filed on Mar. 13, 2020, the contents of all of which are incorporated herein by reference, in their entirety.

TECHNICAL FIELD

The present invention relates to an image processing apparatus, an image processing method, and a computer-readable medium, and for example, to an image processing apparatus, an image processing method, and a computer-readable medium that can efficiently generate point cloud data for training data.

BACKGROUND ART

Recently, statistical machine learning methods have been utilized for recognition techniques using images or the like. In such statistical machine learning, a large amount of label data with correct labels associated with a recognition target is prepared, and this label data is used for training and evaluation (see Non Patent Literature 1 and Non Patent Literature 2, for example).

Patent Literature 1 discloses a shape extraction apparatus that can extract object shapes from three-dimensional point cloud data at high speed, even when the amount of the three-dimensional point cloud data is huge. In this shape extraction apparatus, an inclusive voxel encompassing all of a plurality of points is defined for the three-dimensional point cloud data. The inclusive voxel is segmented into a plurality of virtual voxels having a size larger than the pitch of the plurality of points. Each of the plurality of virtual voxels has a unique identification number. Depending on the presence or absence of a point in virtual voxels to which identification numbers are assigned, a labeling process is performed in units of virtual voxels, and the same label value is assigned to connected virtual voxels among a plurality of virtual voxels that contain a point.

CITATION LIST

Patent Literature

[Patent Literature 1] Japanese Unexamined Patent Application Publication No. 2016-003886

Non Patent Literature

[Non Patent Literature 1] N. Silberman, D. Hoiem, P. Kohli, and R. Fergus. "Indoor segmentation and support inference from RGBD images", In European Conference on Computer Vision (ECCV), 2012.
[Non Patent Literature 2] Shibata, Takashi, Masayuki Tanaka, and Masatoshi Okutomi. "Accurate joint geometric camera calibration of visible and far-infrared cameras." Electronic Imaging 2017.11 (2017): 7-13.

SUMMARY OF INVENTION

Technical Problem

In the above method of assigning the same label value to connected virtual voxels, it is not known what object the virtual voxels correspond to. Moreover, in order to perform an object recognition process using this method, it is necessary to manually identify objects to which label values assigned to virtual voxels correspond. Therefore, this method may not be able to easily generate label data to be used in the object recognition process using three-dimensional point cloud data.

An object of the present disclosure is to provide an image processing apparatus, an image processing method, and a computer-readable medium that solve any of the above-mentioned problems.

Solution to Problem

One aspect to achieve the aforementioned object is an image processing apparatus including:
  a three-dimensional point cloud segmentation unit configured to segment a three-dimensional point cloud of an object using a plurality of clustering parameters so that the smaller a distance between points in the three-dimensional point cloud is, the more likely the points are to be clustered into the same cluster;
  a cluster mapping unit configured to generate a mapped point cloud by mapping clusters of the three-dimensional point cloud to a two-dimensional image based on a correspondence between coordinates of the three-dimensional point cloud and coordinates of pixels of the two-dimensional image;
  a label matching unit configured to assign labels to each point in the mapped point cloud mapped by the cluster mapping unit based on a target label in the two-dimensional image and position information in the two-dimensional image;
  a matching result voting unit configured to vote for labels of each point in the mapped point cloud assigned by the label matching unit; and
  a label determination unit configured to determine a label for each point in the mapped point cloud based on voting results from the matching result voting unit.

One aspect to achieve the aforementioned object may be an image processing method including:
  a step of segmenting a three-dimensional point cloud of an object using a plurality of clustering parameters so that the smaller a distance between points in the three-dimensional point cloud is, the more likely the points are to be clustered into the same cluster;
  a step of generating a mapped point cloud by mapping clusters of the three-dimensional point cloud to a two-dimensional image based on a correspondence between coordinates of the three-dimensional point cloud and coordinates of pixels of the two-dimensional image;
  a step of assigning labels to each point in the mapped point cloud based on a target label in the two-dimensional image and position information in the two-dimensional image;
  a step of voting for the assigned labels of each point in the mapped point cloud; and
  a step of determining a label for each point in the mapped point cloud based on results of the voting.

One aspect to achieve the aforementioned object may be a non-transitory computer-readable medium storing a program that causes a computer to execute:
  a process of segmenting a three-dimensional point cloud of an object using a plurality of clustering parameters so that the smaller a distance between points in the three-dimensional point cloud is, the more likely the points are to be clustered into the same cluster;

a process of generating a mapped point cloud by mapping clusters of the three-dimensional point cloud to a two-dimensional image based on a correspondence between coordinates of the three-dimensional point cloud and coordinates of pixels of the two-dimensional image;

a process of assigning labels to each point in the mapped point cloud based on a target label in the two-dimensional image and position information in the two-dimensional image;

a process of voting for the assigned labels of each point in the mapped point cloud; and a process of determining a label for each point in the mapped point cloud based on results of the voting.

Advantageous Effects of Invention

The present disclosure can provide an image processing apparatus, an image processing method, and a computer-readable medium that solve any of the above-mentioned problems.

BRIEF DESCRIPTION OF DRAWINGS

FIG. 3 is a diagram illustrating a three-dimensional point cloud and the results of clustering using a plurality of clustering parameters in the first example embodiment;

EXAMPLE EMBODIMENT

First Example Embodiment

Figure 1:
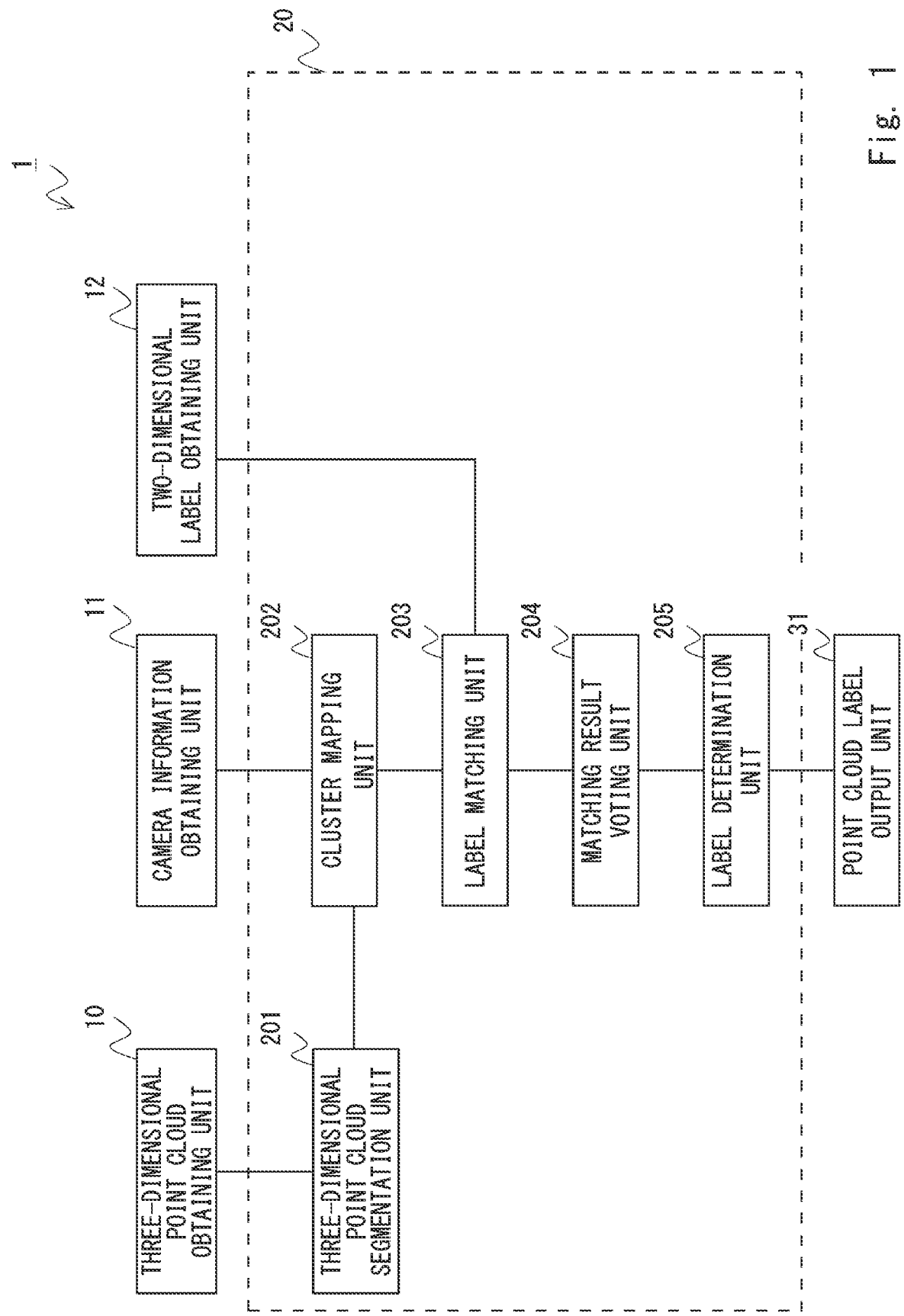
FIG. 1 is a block diagram illustrating a schematic system configuration of an image processing apparatus according to a first example embodiment.

An embodiment for carrying out the present invention will be described in detail with reference to the drawings. FIG. 1 is a block diagram illustrating a schematic system configuration of an image processing apparatus according to a first example embodiment. As shown in FIG. 1, the image processing apparatus 1 according to the present example embodiment includes a three-dimensional point cloud obtaining unit 10, a camera information obtaining unit 11, a two-dimensional label obtaining unit 12, a computer 20, and a point cloud label output unit 31.

Before an overview of each configuration is described below, symbols used herein are listed.

An index to distinguish points in a three-dimensional point cloud: j

The coordinates of each point in the world coordinate system of the three-dimensional point cloud: (Xj, Yj, Zj)

The coordinates of each point in the camera coordinate system: $(x_j, y_j)$

Object label: $B_k$

An index to distinguish objects: k

A label to distinguish objects or attributes: q

Position information: $D_k$

A Clustering parameter: $L_t$

An index to distinguish clustering parameters: t

A variable to distinguish segmented clusters in the world coordinate system: $P_t$ A variable to distinguish segmented clusters in the camera coordinate: $C_t$ An object label allocated to the j-th point cloud and the t-th clustering parameter: $Q_t$.

The number of votes (confidence) for the q-th object label at each point j: $S_{jq}$ The object label of the j-th point in the point cloud: $G_j$

[Three-Dimensional Point Cloud Obtaining Unit]

The three-dimensional point cloud obtaining unit 10 obtains information on a three-dimensional point cloud of an object by a three-dimensional point cloud obtaining apparatus or the like. Specifically, the three-dimensional point cloud obtaining unit 10 uses a distance-measuring apparatus such as Light Detection And Ranging, Laser Imaging Detection and Ranging (LiDAR) to obtain the coordinates of three-dimensional points in space. The three-dimensional point cloud obtaining unit 10 obtains a set of coordinates of three-dimensional points in space as a three-dimensional point cloud.

For example, 3D-LiDAR, which is widely used for topographical surveys, self-driving and the like, can collect high-density and extensive distance data from a measurement point for an object in three-dimensional space as three-dimensional point cloud data. The three-dimensional point cloud obtaining unit 10 obtains, as a three-dimensional point cloud, data reflecting the structure of the real environment obtained by this 3D-LiDAR, i.e., a set of three-dimensional points having three-dimensional coordinate information obtained by means of reflection from a target object such as a person and an automobile, and structures such as the ground, buildings, and signs.

In the following, the coordinates of the three-dimensional point cloud are denoted by $(X_j, Y_j, Z_j)$. j is an index to distinguish points in the three-dimensional point cloud. In addition to a set of coordinates of three-dimensional points, the three-dimensional point cloud obtaining unit 10 may simultaneously obtain information about the apparatus or time and position information such as a latitude and a longitude at which the three-dimensional points are obtained. Furthermore, the three-dimensional point cloud obtaining unit 10 may record the obtained image or measurements in a memory (not shown) or the like.

[Camera Information Obtaining Unit]

The camera information obtaining unit (information obtaining unit) 11 obtains camera information, including the correspondence between the coordinates of a three-dimensional point cloud and the coordinates of pixels in a two-dimensional image. More specifically, the camera information obtaining unit 11 obtains camera information including parameters (hereinafter referred to as "conversion parameters") necessary for conversion between the position of coordinates of a three-dimensional point cloud (i.e., three-dimensional coordinates in the world coordinate) and the coordinates of a pixel in a two-dimensional image (i.e., two-dimensional coordinates obtained by projection from the camera coordinate).

For example, the camera information obtaining unit 11 obtains, as conversion parameters, external parameters that relate the coordinates of a three-dimensional point cloud to the coordinates of pixels in a two-dimensional image, and internal parameters of the camera used to obtain the two-dimensional image. Alternatively, the camera information obtaining unit 11 may obtain, instead of the internal parameters and the external parameters, parameters for rotation and translation between the coordinate system representing the coordinates of a three-dimensional point cloud (i.e., the world coordinate) and the coordinate system of the camera used to obtain a two-dimensional image (i.e., the camera coordinate).

The camera information obtaining unit 11 may record the obtained camera information in a memory (not shown) or the like. The camera information obtaining unit 11 may obtain the correspondence between the coordinates of a three-dimensional point cloud and the coordinates of pixels in a two-dimensional image separately by calculating using camera calibration techniques or the like.

The image processing apparatus 1 according to the first example embodiment may be configured without the camera information obtaining unit 11. In this case, the above-mentioned camera information may be preset in a cluster mapping unit 202.

[Two-Dimensional Label Obtaining Unit]

The two-dimensional label obtaining unit 12 obtains the label of a target object in a two-dimensional image and its position information in the two-dimensional image. The label of an object is a label for the type of the object, for example, person, car, dog, or bicycle. The label of an object may be a label for attribute information such as red clothing, blue bag, age, and gender. The above-mentioned position information in a two-dimensional image is, for example, the coordinates of four points of the box of the target object or similar information. The position information in a two-dimensional image may be the coordinates of the center of the object, or it may be several points of the coordinates present on the object.

The two-dimensional label obtaining unit 12 may calculate the above-mentioned label and its position information in the two-dimensional image automatically by a detection method such as machine learning. The above-mentioned label and its position information in the two-dimensional image may be manually input to the two-dimensional label obtaining unit 12. The two-dimensional label obtaining unit 12 may obtain the above-mentioned label and its position information in the two-dimensional image by combining manual input and a detection method based on machine learning.

The image processing apparatus 1 according to the first example embodiment may be configured without the two-dimensional label obtaining unit 12. In this case, the above-mentioned label and its position information in the two-dimensional image may be preset in a label matching unit 203.

The two-dimensional label obtaining unit 12 may record the obtained label and its position information in the two-dimensional image in a memory (not shown) or the like. In the following, the camera coordinates of each point in a three-dimensional point cloud are denoted by $(x_j, y_j)$. j is an index to distinguish points in the point cloud.

The above-mentioned label of an object is denoted by $B_k$, where k is an index to distinguish objects. A value allocated to the label $B_k$ and representing a label for the type of an object or an attribute is denoted using q below.

By associating the value of q with an object or attribute, for example, by associating q=1 with a person and q=2 with a car, the label $B_k$ can distinguish the content of the label. The k-th label $B_k$ is expressed as $B_k=q$. Its position information in the two-dimensional image obtained along with each label $B_k$ is denoted as $D_k$.

The following description is provided on the assumption that the position information $D_k$ is given as information on a box enclosing an object, but the scope encompassed by the position information $D_k$ in the present invention is not limited to this. For example, the coordinates of the center of an object may be used as the position information, as described above, or several points of the coordinates present on the object may be used as the position information and expressed as $D_k$.

[Computer]

The computer 20 has, for example, a common computer hardware configuration including a processor such as a Central Processing Unit (CPU) and a Graphics Processing Unit (GPU), an internal memory such as a Random Access Memory (RAM) and a Read Only Memory (ROM), a storage device such as a Hard Disk Drive (HDD) and a Solid State Drive (SSD), an input and output I/F for connecting peripheral equipment such as a display, and a communication I/F for communicating with equipment outside the apparatus.

The computer 20, for example, can realize each of the functional components described below by the processor utilizing the internal memory to execute programs stored in the storage device, internal memory or the like.

Figure 2:
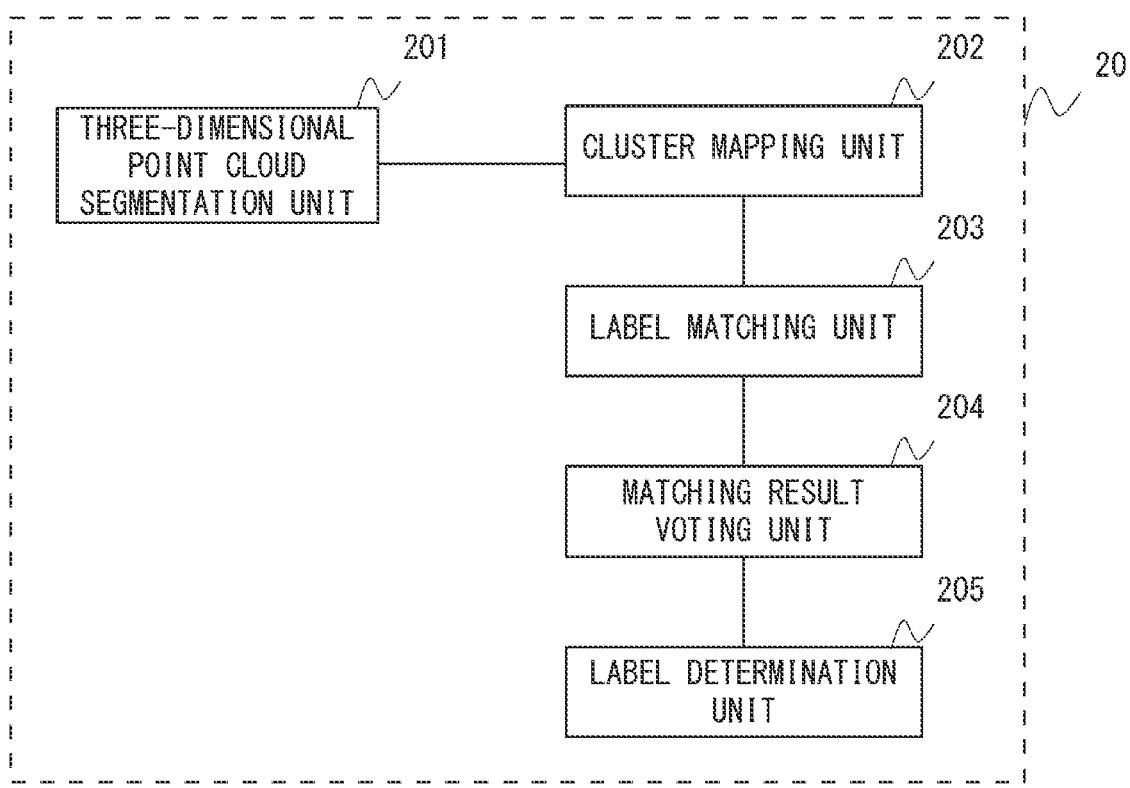
FIG. 2 is a block diagram illustrating a schematic system configuration of a computer according to the first example embodiment.

FIG. 2 is a block diagram illustrating a schematic system configuration of the computer according to the first example embodiment. The computer 20 according to the first example embodiment includes a three-dimensional point cloud segmentation unit 201, a cluster mapping unit 202, a label matching unit 203, a matching result voting unit 204, and a label determination unit 205.

[Three-Dimensional Point Cloud Segmentation Unit]

The three-dimensional point cloud segmentation unit 201 segments a three-dimensional point cloud obtained by the three-dimensional point cloud obtaining unit 10 using a plurality of clustering parameters so that the smaller the distance between points is, the more likely the points are to be clustered into the same cluster.

The distance between these points is, for example, the Euclidean distance. The clustering parameters are, for example, parameters for segmenting the three-dimensional point cloud so that the distance between points in different clusters is greater than or equal to the minimum distance L. Thus, when the three-dimensional point cloud is segmented using clustering parameters based on the minimum distance L, it is ensured that points belonging to one cluster are surely at least the minimum distance L away from points belonging to another cluster.

FIG. 3 is a diagram illustrating a three-dimensional point cloud and the results of clustering using a plurality of clustering parameters in the first example embodiment. As shown in FIG. 3, the three-dimensional point cloud segmentation unit 201 prepares a plurality of values for this minimum distance L (e.g., $L_1=0.01$, $L_2=0.1$, $L_3=1$) and segments the three-dimensional point cloud for each of these different distances.

Each of these parameters are hereinafter referred to as a clustering parameter $L_t$. t is an index to distinguish the clustering parameters. The resulting segmented clusters are allocated to respective points in the three-dimensional point cloud as integer cluster labels. That is, each point j in the three-dimensional point cloud is allocated an integer cluster label as a result of clustering. In the following, an integer cluster label is denoted as $P_t$. t is an index to distinguish the clustering parameters. This means that each point in the three-dimensional point cloud is assigned one of the t segmented clusters $P_t$. $P_t$ is hereinafter referred to as a segmented cluster.

The segmentation method used by the three-dimensional point cloud segmentation unit 201 is not limited to the above-mentioned method. For example, the three-dimensional point cloud segmentation unit 201 may use the number of segmentations of the three-dimensional point cloud obtained by the three-dimensional point cloud obtaining unit 10 as a parameter to segment the three-dimensional point cloud into the specified clusters.

[Cluster Mapping Unit]

Figure 4:
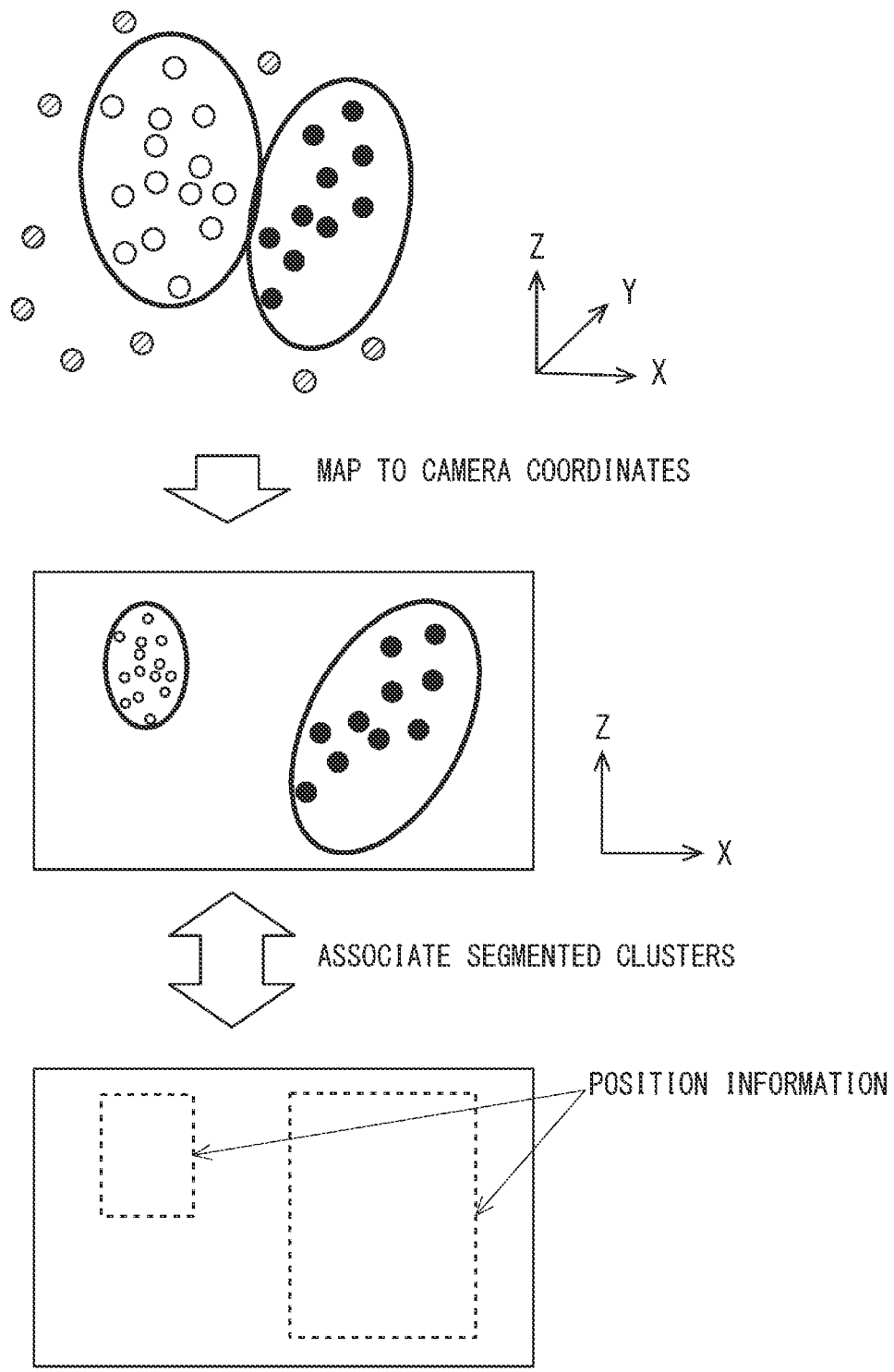
FIG. 4 is a diagram illustrating the operations of a cluster mapping unit and a label matching unit in the first example embodiment.

The cluster mapping unit 202 maps the segmented clusters $P_t$ of a three-dimensional point cloud to camera coordinates for which two-dimensional labels are defined, as shown in FIG. 4, based on camera information obtained by the camera information obtaining unit 11 and clustering results obtained by the three-dimensional point cloud segmentation unit 201. The aforementioned camera information includes, for example, conversion parameters such as internal parameters and external parameters. The above clustering results include, for example, segmented clusters $P_t$ and three-dimensional point cloud coordinates $(X_j, Y_j, Z_j)$.

The cluster mapping unit 202 generates a mapped point cloud by mapping clusters of a three-dimensional point cloud to a two-dimensional image based on the correspondence between the coordinates of the three-dimensional point cloud and the coordinates of the two-dimensional image obtained by the camera information obtaining unit 11.

In order to perform the above-described mapping, a mapping from the three-dimensional point cloud coordinates to the two-dimensional image plane needs to be defined. The mapping from the three-dimensional point cloud coordinates to the two-dimensional image plane is provided on the assumption that the plane coordinates for which two-dimensional labels are defined here are in the coordinate system of the image based on which the two-dimensional labels are assigned, i.e., camera coordinates.

The cluster mapping unit 202 calculates this mapping based on conversion parameters such as internal parameters and external parameters obtained by the camera information obtaining unit 11. In the following, a segmented cluster after mapping to the camera coordinates is denoted by $C_t$ and distinguished from a segmented cluster $P_t$ that is not mapped to the camera coordinates yet.

[Label Matching Unit]

As shown in FIG. 4, the label matching unit 203 assigns labels to each point in a mapped point cloud mapped by the cluster mapping unit 202 based on the position information $D_k$ and the object label $B_k$ obtained by the two-dimensional label obtaining unit 12.

For example, the label matching unit 203 matches segmented clusters $C_t$ projected to a two-dimensional image plane by the cluster mapping unit 202 and two-dimensional labels obtained by the two-dimensional label obtaining unit 12 to select segmented clusters $C_t$ that conform to the respective two-dimensional labels. More specifically, for each segmented cluster $C_t$ projected onto the camera coordinates, the label matching unit 203 uses the following expression to search for the position information $D_k$ corresponding to each point j E $C_t$ and associates the label $B_k$ with the segmented cluster $C_t$.

$$Q_{jt}=B_k, \text{ if } C_t - D_k \quad \text{[Expression 1]}$$

In the above expression, $Q_{jt}$ represents an object label assigned in the j-th mapped point cloud in the t-th division parameter $L_t$ in the three-dimensional point cloud segmentation unit 201. The symbol "—" in the above expression indicates that the segmented cluster $C_t$ after mapping to the camera coordinate systems and the position information Dt are associated with each other.

The label matching unit 203 searches for the corresponding label $B_k$ and position information $D_k$ for each segmented cluster $C_t$, and associates the label $B_k$ and position information $D_k$ with the segmented cluster $C_t$. The more the mapped segmented cluster $C_t$ and the position information $D_k$ overlap, the more points belonging to the segmented cluster $C_t$ are allocated the label $B_k$ corresponding to the position information $D_k$. In other words, the label matching unit 203 matches a segmented cluster $C_t$ with position information $D_k$ based on the proportion of the points located inside the position information $D_k$ among points j ∈ $C_t$ belonging to the segmented cluster $C_t$ (the point cloud mapped to the image plane).

The label matching unit 203 calculates, for each segmented cluster $C_t$, the coverage ratio of the mapped point cloud included in position information $D_k$, and assigns to the segmented cluster $C_t$ the same label as that corresponding to the position information $D_k$ with the highest coverage ratio. If the highest coverage ratio for a certain small cluster does not exceed a predetermined threshold, the label matching unit 203 may not assign any particular label (Label=UnKnown).

The label matching unit 203 calculates the coverage ratio according to the following expression.

$$\frac{\text{Num}(j \in C_t \cap D_k)}{\text{Num}(j \in C_t)} \quad \text{[Expression 2]}$$

In the above expression, $C_t$ denotes a segmented cluster, $D_k$ denotes position information, and j denotes an element point of a small cluster. Num(·) is a function that counts the number of elements. In the above expression, the denominator represents the number of points in a mapped point cloud included in the segmented cluster $C_t$, and the numerator represents the number of points in the segmented cluster $C_t$ after mapping to the camera coordinates included in the position information $D_k$.

The matching method used by the Label matching unit 203 is not limited to the above-mentioned method. For example, instead of calculating the coverage ratio by the above expression, the label matching unit 203 may calculate Intersection over Union (IoU) and use this value to assign the same label $B_k$ as that corresponding to the position information $D_k$ with the highest Intersection over Union. If the highest Intersection over Union for a certain small cluster does not exceed a predetermined threshold, the label matching unit 203 may not assign any particular label (Label=UnKnown).

[Matching Result Voting Unit]

The matching result voting unit 204 aggregates by voting for labels $Q_{jt}$ obtained by the label matching unit 203 for each point in a mapped point cloud for respective clustering parameters.

For example, the matching result voting unit 204 uses the labels $Q_{jt}$ of each point in the mapped point cloud to calculate the confidence $S_{jq}$ for the labels $Q_{jt}$. More specifically, the matching result voting unit 204 calculates the confidence $S_{jq}$ for the labels $Q_jt$ using the following expression based on the labels $Q_{jt}$.

$$S_{jq} = \sum_t \delta(Q_{jt}, q) \qquad \text{[Expression 3]}$$

In the above expression, q is a value representing the type of an object label, and δ(a, b) is a function that returns 1 if a and b are equal and 0 if a and b are different. The confidence $S_{jq}$ is an array having q bins for each point in the point cloud.

The method of calculating the confidence $S_{jq}$ by the matching result voting unit 204 is not limited to the above-mentioned method. For example, when the confidence $S_{jq}$ is calculated, the matching result voting unit 204 may vote not only for the labels of the point j in the point cloud in question, but also for the labels of points around the point j in the point cloud.

More specifically, the matching result voting unit 204 may calculate the confidence $S_{jq}$ using the following expression. In the expression, O(j) is a set of points around the point j in the point cloud.

$$S_{jq} = \sum_{j \in O(j)} \sum_t \delta(Q_{jt}, q) \qquad \text{[Expression 4]}$$

[Label Determination Unit]

The label determination unit 205 determines the label for each point in the mapped point cloud based on voting results from the matching result voting unit 204. For example, the label determination unit 205 uses the confidence $S_{jq}$ calculated by the matching result voting unit 204 to determine that a value which maximizes q is the label of each point j in the point cloud. More specifically, the label determination unit 205 uses the value $G_j$, calculated using the following expression, as the label of the j-th point in the point cloud.

$$G_j = \underset{q}{\operatorname{argmax}}\, S_{jq} \qquad \text{[Expression 5]}$$

In the following, the label determined by the label determination unit 205 is denoted as $G_j$.

The label determination method used by the label determination unit 205 is not limited to the above-mentioned method. For example, the label determination unit 205 may determine that a scheme of manually allocating a label to each point in the mapped point cloud is used if the maximum value of the confidence $S_{jq}$ is less than a first predetermined value according to a vote held by the matching result voting unit 204. That is, when the label for each point in the mapped point cloud is determined based on voting results from the matching result voting unit 204, if no confidence $S_{jq}$ for the label in question is equal to or higher than the first predetermined value, the label determination unit 205 may determine that a scheme of manually allocating a label is used. The aforementioned first predetermined value may be set in advance in the label determination unit 205.

The label determination unit 205 may determine that, as the above-mentioned scheme of manually allocating a label, for example, a scheme in which, when no confidence $S_{jq}$ for the label in question is equal to or higher than the first predetermined value, a plurality of labels with the confidence $S_{jq}$ higher than a second predetermined value are displayed on a display or the like, and an operator selects one of the displayed labels is used. The second predetermined value is less than the first predetermined value (the first predetermined value>the second predetermined value) and may be set in advance in the label determination unit

[Point Cloud Label Output Unit]

The point cloud label output unit 31 outputs the label of the j-th point in a point cloud determined by the label determination unit 205. The point cloud label output unit 31 may display output results on a display or output resulting values to a recording apparatus such as a memory.

Figure 5:
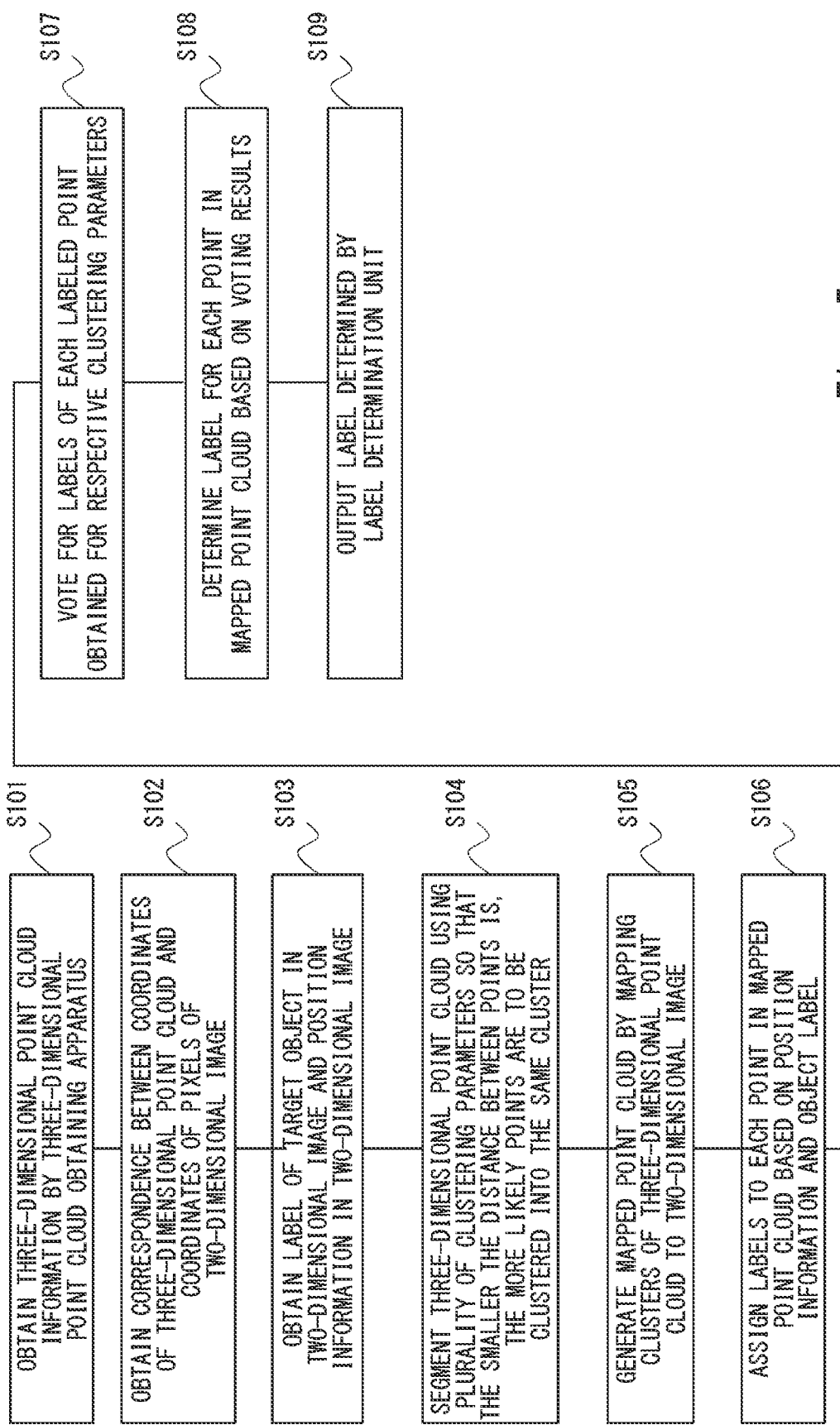
FIG. 5 is a flowchart illustrating the flow of an image processing method according to the first example embodiment.

An image processing method according to the present example embodiment is now described. FIG. 5 is a flowchart illustrating the flow of the image processing method according to the first example embodiment. The three-dimensional point cloud obtaining unit 10 obtains information on a three-dimensional point cloud by a three-dimensional point cloud obtaining apparatus (Step S101).

The camera information obtaining unit 11 obtains the correspondence between the coordinates of the three-dimensional point cloud and the coordinates of pixels in a two-dimensional image (Step S102). The two-dimensional label obtaining unit 12 obtains the label of a target object in the two-dimensional image and its position information in the two-dimensional image (Step S103).

The three-dimensional point cloud segmentation unit 201 segments the three-dimensional point cloud obtained by the three-dimensional point cloud obtaining unit 10 using a plurality of clustering parameters so that the smaller the distance between points is, the more likely the points are to be clustered into the same cluster (Step S104).

The cluster mapping unit 202 generates a mapped point cloud by mapping clusters of the three-dimensional point cloud to the two-dimensional image based on the correspondence between the coordinates of the three-dimensional point cloud and the coordinates of the two-dimensional image obtained by the camera information obtaining unit 11 (Step S105).

The label matching unit 203 assigns labels to each point in the mapped point cloud mapped by the cluster mapping unit 202 based on the position information and the object label obtained by the two-dimensional label obtaining unit 12 (Step S106).

The matching result voting unit 204 aggregates by voting for labels obtained by the label matching unit 203 for each labeled point in the mapped point cloud for respective clustering parameters (Step S107).

The label determination unit 205 determines the label for each point in the mapped point cloud based on voting results from the matching result voting unit 204 (Step S108). The point cloud label output unit 31 outputs the label determined by the label determination unit 205 (Step S109).

Figure 6:
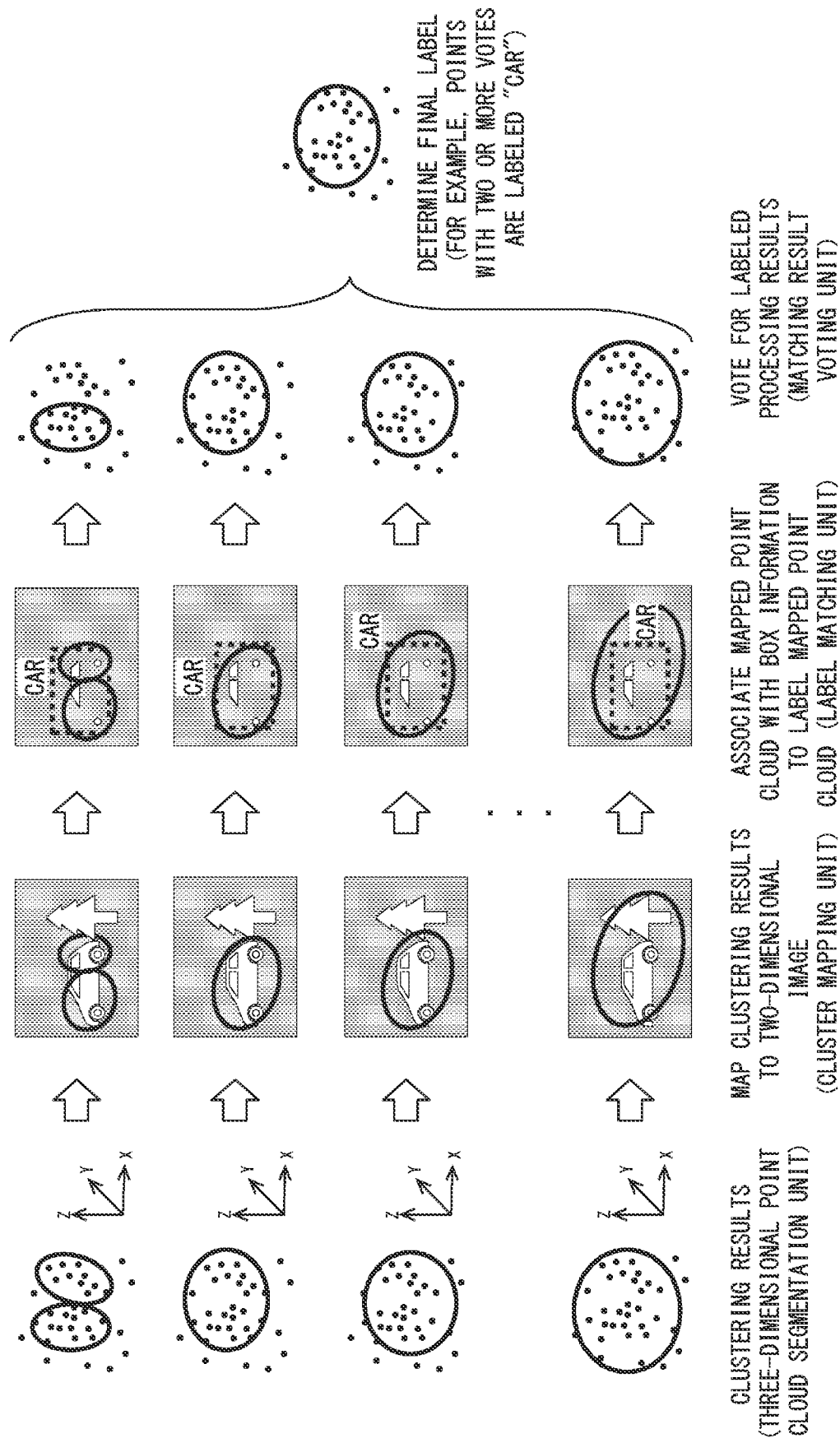
FIG. 6 a diagram illustrating effects of the image processing apparatus and the image processing method according to the first example embodiment.

Next, effects of the image processing apparatus and the image processing method according to the first example embodiment are described in detail with reference to FIG. 6. For example, it is desirable to treat a three-dimensional point cloud corresponding to the position coordinates of the car in FIG. 6 as one cluster, but if the shape of the three-dimensional point cloud is complex, it is difficult to cluster it into one cluster.

In the first example embodiment, a plurality of clustering parameters are used to output segmentation results at different scales, and a label is assigned to each of these segmented clusters. Finally, these results are aggregated, and the label with the highest number of votes, i.e., the label for which the identical label is output for the highest number of clustering parameters is deemed as the correct label. This enables, for example, more robust labels to be easily generated and assigned to points in a three-dimensional point cloud even when the shape of the three-dimensional point cloud is complex.

As described above, the image processing apparatus 1 according to the present example embodiment includes: the three-dimensional point cloud segmentation unit 201 configured to segment a three-dimensional point cloud of an object using a plurality of clustering parameters so that the smaller the distance between points in the three-dimensional point cloud is, the more likely the points are to be clustered into the same cluster; the cluster mapping unit 202 configured to generate a mapped point cloud by mapping clusters of the three-dimensional point cloud to a two-dimensional image based on the correspondence between the coordinates of the three-dimensional point cloud and the coordinates of pixels of the two-dimensional image; the label matching unit 203 configured to assign labels to each point in the mapped point cloud mapped by the cluster mapping unit 202 based on a target label in the two-dimensional image and position information in the two-dimensional image; the matching result voting unit 204 configured to vote for the labels of each point in the mapped point cloud assigned by the label matching unit 203; and the label determination unit 205 configured to determine the label for each point in the mapped point cloud based on voting results from the matching result voting unit 204, as shown in FIG. 2.

The image processing apparatus 1 according to the present example embodiment segments a three-dimensional point cloud with a plurality of clustering parameters, assigns labels to each point in the three-dimensional point cloud for respective clustering parameters, and votes for the labels of each point. This makes it possible to easily generate label data to be used in an object recognition process using three-dimensional point cloud data.

Second Example Embodiment

Figure 7:
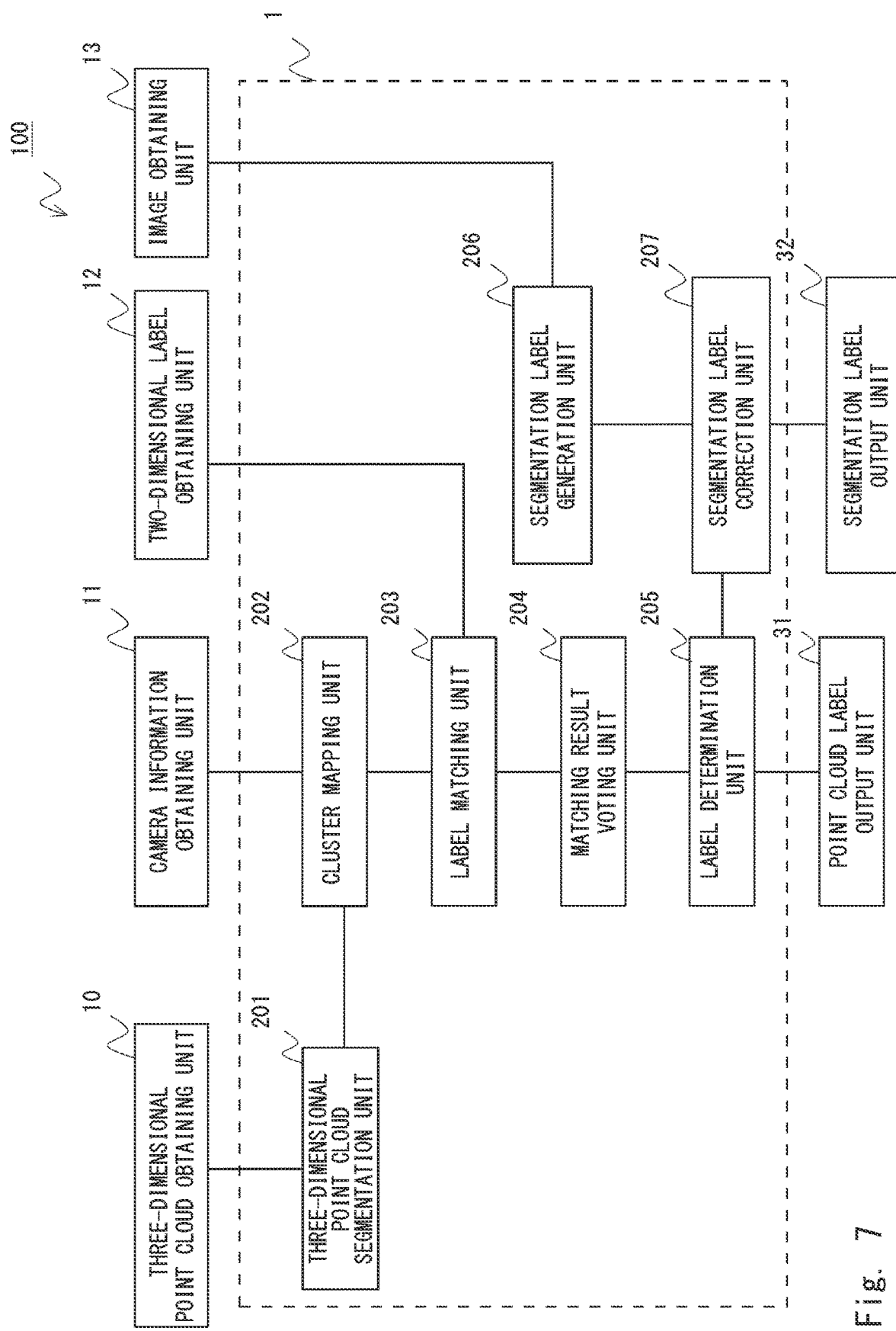
FIG. 7 is a block diagram illustrating a schematic system configuration of an image processing apparatus according to a second example embodiment.

FIG. 7 is a block diagram illustrating a schematic system configuration of an image processing apparatus according to a second example embodiment. As shown in FIG. 7, the image processing apparatus 100 according to the second example embodiment has a configuration in which an image obtaining unit 13 and a segmentation label output unit 32 are further included in the configuration according to the first example embodiment. A computer according to the second example embodiment has a configuration in which a segmentation label generation unit 206 and a segmentation label correction unit 207 are further included in the configuration according to the first example embodiment.

[Image Obtaining Unit]

The image obtaining unit 13 obtains an image of a scene for which a three-dimensional point cloud is obtained by a three-dimensional point cloud obtaining unit 10 at the same time and the same place. For example, the image obtaining unit 13 obtains one or more two-dimensional images or measurements by a camera, a measurement sensor or the like. The two-dimensional images or measurements are not limited to visible images and may be images obtained by other sensors, for example. The two-dimensional images or measurements may be thermal images, depth images or the like. The image obtaining unit 13 records the obtained two-dimensional images or measurements in a memory (not shown) or the like.

The image obtaining unit 13 may obtain intermediate processing results during deep learning as multi-channel two-dimensional images. Alternatively, the image obtaining unit 13 may obtain vector data such as velocity or density fields calculated by numerical simulation or the like as multi-channel two-dimensional images.

Furthermore, the two-dimensional images are not limited to images obtained by a single camera. For example, the image obtaining unit 13 may obtain multi-modal images including visible and far-infrared images as moving images. In this case, for example, the image obtaining unit 13 may align these images using the method shown in Non Patent Literature 3 below. The image obtaining unit 13 may also synthesize a single image from these images using the method shown in Non Patent Literature 4 below.

(Non Patent Literature 3)

Shibata, Takashi, Masayuki Tanaka, and Masatoshi Okutomi. "Accurate joint geometric camera calibration of visible and far-infrared cameras." Electronic Imaging 2017.11 (2017): 7-13.

(Non Patent Literature 4)

Shibata, Takashi, Masayuki Tanaka, and Masatoshi Okutomi. "Unified Image Fusion Framework With Learning-Based Application-Adaptive Importance Measure." IEEE Transactions on Computational Imaging 5.1 (2018): 82-96.

[Segmentation Label Generation Unit]

The segmentation label generation unit 206 generates segmentation labels based on an image obtained by the image obtaining unit 13. The segmentation label generation unit 206 generates segmentation labels using, for example, semantic segmentation, which segments the image into different areas for respective object types. A method of semantic segmentation is disclosed, for example, in the following Non Patent Literature 5, which can be incorporated herein by reference.

(Non Patent Literature 5)

Long, Jonathan, Evan Shelhamer, and Trevor Darrell. "Fully convolutional networks for semantic segmentation." Proceedings of the IEEE conference on computer vision and pattern recognition. 2015.

[Segmentation Label Correction Unit]

The segmentation label correction unit 207 compares an object label determined by the label determination unit 205 and a segmentation label generated by the segmentation label generation unit 206, and if there is a difference between the two labels, the segmentation label is corrected to be the same as the label determined by the label determination unit 205.

More specifically, if the label $G_j$ of a point j in the point cloud determined by the label determination unit 205 is different from the corresponding segmentation label generated by the segmentation label generation unit 206, the segmentation label correction unit 207 replaces the segmentation label by the label G of the point j in the point cloud.

[Segmentation Label Output Unit]

The segmentation label output unit 32 outputs the segmentation label corrected by the segmentation label correction unit 207. The segmentation label output unit 32 may display output results on a display or output resulting values to a recording apparatus such as a memory.

Although some example embodiments of the present invention are described, these example embodiments are presented as examples and are not intended to limit the scope of the invention. These novel example embodiments can be implemented in various other forms, and various omissions, substitutions, and changes can be made without departing from the gist of the invention. These example embodiments and variations thereof are within the scope of the invention set forth in the claims and equivalents thereof as well as within the scope and gist of the invention.

In the present invention, the process shown in FIG. 5 can also be realized, for example, by causing a processor to execute computer programs.

The programs can be stored in various types of non-transitory computer-readable media and can be supplied to a computer. The non-transitory computer-readable media include various types of tangible recording media (tangible storage medium). Examples of the non-transitory computer-readable media include a magnetic recording medium (e.g., flexible disk, magnetic tape, and hard disk drive), a magneto-optical recording medium (e.g., magneto-optical disk), a Read Only Memory (CD-ROM), a CD-R, a CD-R/W, a semiconductor memory (e.g., mask ROM, Programmable ROM (PROM), Erasable PROM (EPROM), Flash ROM, and random access memory (RAM)).

The programs may be stored in various types of transitory computer-readable media and can be supplied to a computer. Examples of the transitory computer-readable media include an electric signal, an optical signal, and an electromagnetic wave. The transitory computer-readable media can supply the programs to a computer via wired communication channels such as electric wires and optical fibers, or wireless communication channels.

In addition, each of the units constituting the image processing apparatuses according to the above-mentioned example embodiments can be realized not only by programs but also partially or completely by dedicated hardware such as an Application Specific Integrated Circuit (ASIC) and a Field-Programmable Gate Array (FPGA).

REFERENCE SIGNS LIST

1 IMAGE PROCESSING APPARATUS
10 THREE-DIMENSIONAL POINT CLOUD OBTAINING UNIT
11 CAMERA INFORMATION OBTAINING UNIT
12 TWO-DIMENSIONAL LABEL OBTAINING UNIT
13 IMAGE OBTAINING UNIT
20 COMPUTER
31 POINT CLOUD LABEL OUTPUT UNIT
32 SEGMENTATION LABEL OUTPUT UNIT
100 IMAGE PROCESSING APPARATUS
201 THREE-DIMENSIONAL POINT CLOUD SEGMENTATION UNIT
202 CLUSTER MAPPING UNIT
203 LABEL MATCHING UNIT
204 MATCHING RESULT VOTING UNIT
205 LABEL DETERMINATION UNIT
206 SEGMENTATION LABEL GENERATION UNIT
207 SEGMENTATION LABEL CORRECTION UNIT

What is claimed is:

1. An image processing apparatus comprising:
a memory storing instructions; and
a processor configured to execute the instructions to:
segment a three-dimensional point cloud of an object using a plurality of clustering parameters so that the smaller a distance between points in the three-dimensional point cloud is, the more likely the points are to be clustered into the same cluster;
generate a mapped point cloud by mapping clusters of the three-dimensional point cloud to a two-dimensional image based on a correspondence between coordinates of the three-dimensional point cloud and coordinates of pixels of the two-dimensional image;
assign labels to each point in the mapped point cloud based on a target label in the two-dimensional image and position information in the two-dimensional image;
vote for the labels of each point in the mapped point cloud assigned by the label matching unit; and
determine for each point in the mapped point cloud, one of the labels based on voting results.

2. The image processing apparatus according to claim 1, wherein the processor is configured to execute the instructions to further:
obtain a three-dimensional point cloud of the object;
obtain a correspondence between coordinates of the three-dimensional point cloud and coordinates of pixels in a two-dimensional image;
obtain a target label in the two-dimensional image and position information in the two-dimensional image; and
output a label of each point in the mapped point cloud.

3. The image processing apparatus according to claim 1, wherein the processor is configured to execute the instructions to further:
obtain an image of a scene for which the three-dimensional point cloud is obtained at the same time and the same place;
generate, by using semantic segmentation, a segmentation label for each point, from the image;
compare, for each point, the one of the labels and the segmentation label, and if there is a difference, correct the segmentation label to be the same as the one of the labels; and
output the corrected label.

4. The image processing apparatus according to claim 1, wherein when the one of the labels for each point in the mapped point cloud is determined based on the voting results, if no confidence for the one of the labels for each point is equal to or higher than a first predetermined value, the processor is configured to execute the instructions to further determine that a manual label allocation scheme is used for each point in the mapped point cloud.

5. The image processing apparatus according to claim 4, wherein the processor is configured to execute the instructions to determine that, as the manual label allocation scheme, a scheme is used in which, when no confidence for the one of the labels for each point is equal to or higher than the first predetermined value, a plurality of different labels with confidence higher than a second predetermined value lower than the first predetermined value are displayed on a display, and an operator selects one of the displayed different labels.

6. The image processing apparatus according to claim 1, wherein the processor is configured to execute the instructions to vote not only for the labels of each point in the mapped point cloud assigned, but also for the labels of the points around each point in the mapped point cloud.

7. An image processing method performed by a computer and comprising:
segmenting a three-dimensional point cloud of an object using a plurality of clustering parameters so that the smaller a distance between points in the three-dimensional point cloud is, the more likely the points are to be clustered into the same cluster;
generating a mapped point cloud by mapping clusters of the three-dimensional point cloud to a two-dimensional image based on a correspondence between coordinates of the three-dimensional point cloud and coordinates of pixels of the two-dimensional image;

assigning labels to each point in the mapped point cloud based on a target label in the two-dimensional image and position information in the two-dimensional image;

voting for the labels of each point in the mapped point cloud; and determining for each point in the mapped point cloud, one of the labels based on voting results.

8. A non-transitory computer-readable medium storing a program executable by a computer to perform processing comprising:

segmenting a three-dimensional point cloud of an object using a plurality of clustering parameters so that the smaller a distance between points in the three-dimensional point cloud is, the more likely the points are to be clustered into the same cluster;

generating a mapped point cloud by mapping clusters of the three-dimensional point cloud to a two-dimensional image based on a correspondence between coordinates of the three-dimensional point cloud and coordinates of pixels of the two-dimensional image;

assigning labels to each point in the mapped point cloud based on a target label in the two-dimensional image and position information in the two-dimensional image;

voting for the labels of each point in the mapped point cloud; and determining for each point in the mapped point cloud, one of the labels based on voting results.

* * * * *